No. 610,671. Patented Sept. 13, 1898.
J. W. CYPHER.
MOWING MACHINE.
(Application filed Jan. 31, 1898.)
(No Model.) 2 Sheets—Sheet 2.
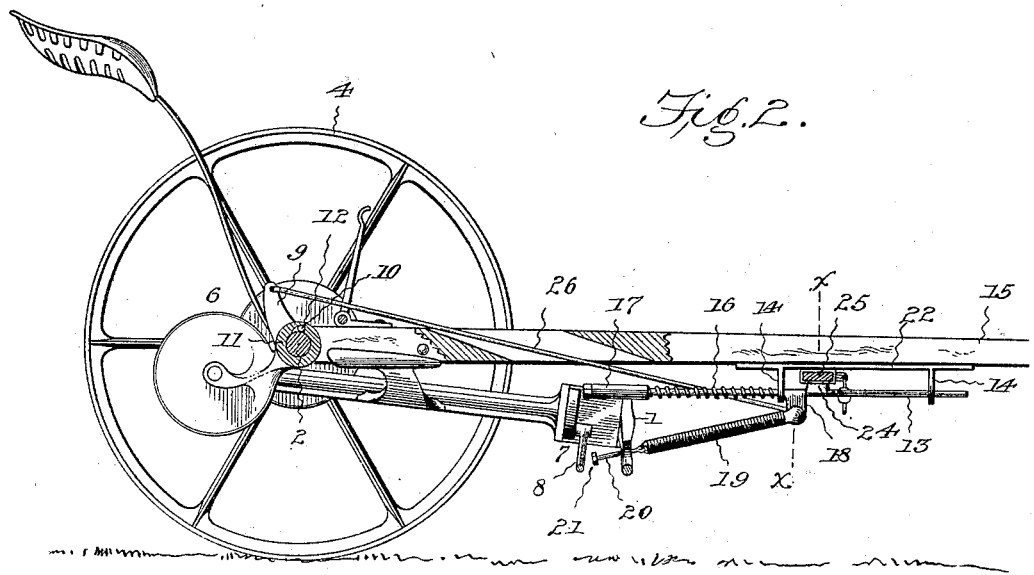
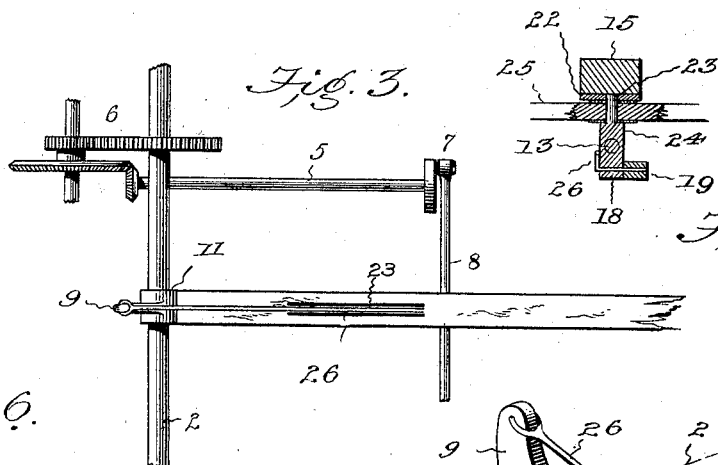
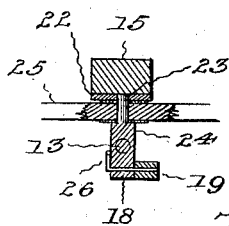
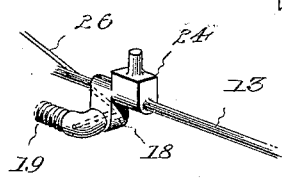
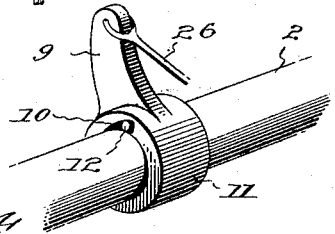
Witnesses
E. F. Monroe
V. B. Hillyard
John W. Cypher, Inventor
By his Attorneys,
C. A. Snow & Co.

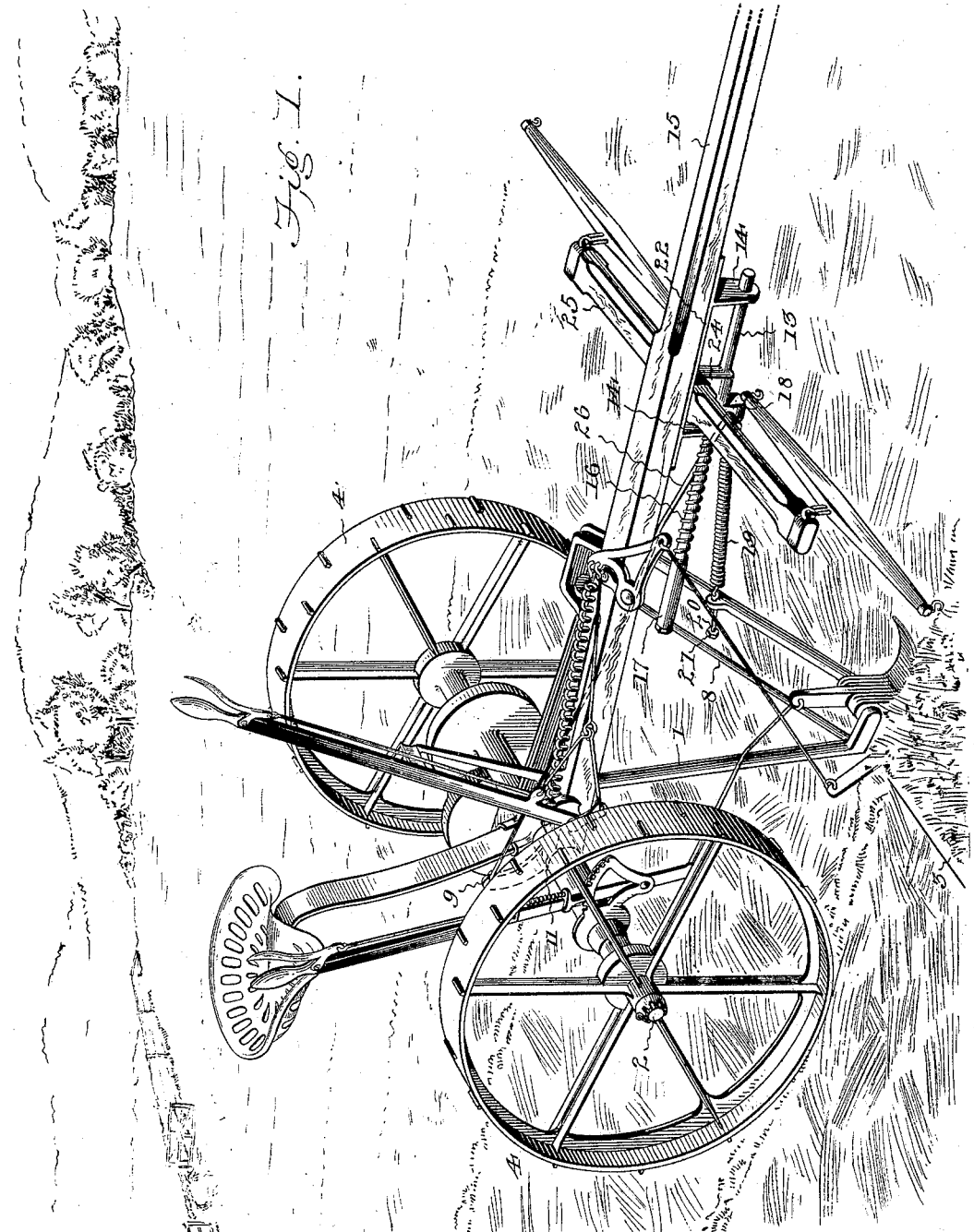

UNITED STATES PATENT OFFICE.

JOHN W. CYPHER, OF BENTON, ILLINOIS.

MOWING-MACHINE.

SPECIFICATION forming part of Letters Patent No. 610,671, dated September 13, 1898.

Application filed January 31, 1898. Serial No. 668,598. (No model.)

*To all whom it may concern:*

Be it known that I, JOHN W. CYPHER, a citizen of the United States, residing at Benton, in the county of Franklin and State of Illinois, have invented a new and useful Mowing-Machine, of which the following is a specification.

This invention relates to means for giving an initial movement to the cutting apparatus of mowing and reaping machines an instant prior to starting the machine itself, thereby preventing the strain upon the team and machine where the inertia of the latter and the cutting apparatus is to be simultaneously overcome.

An essential feature of the invention is to simplify the general construction of the machine and to dispose the operating parts to secure compactness and so as not to interfere with the train of mechanism essential for transmitting motion to the cutting apparatus and for moving the latter to secure the varied adjustments to suit the height of the crop and the rolling nature of the surface of the ground over which the machine is advanced.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a mowing-machine having the invention applied thereto. Fig. 2 is a longitudinal section. Fig. 3 is a detail plan view showing the arrangement of the gearing. Fig. 4 is a detail perspective view showing the lever and clutch between the said lever and axle. Fig. 5 is a detail section on the line X X of Fig. 2, looking to the front. Fig. 6 is a detail perspective view of the rod carrying the doubletree and the parts coöperating therewith.

Corresponding and like parts are referred to in the following description and indicated in all the views of the drawings.

The mowing-machine illustrated is of common construction, and the cutting apparatus is adapted to be folded and tilted by a system of levers and connections which are old and well understood. The frame 1 is mounted upon the axle 2 in the usual way and has the cutting apparatus 3 applied thereto. The ground or drive wheels 4 are mounted upon the ends of the axle 2 in the ordinary manner, so as to turn forward therewith and admit of them moving at different speeds when passing over rolling ground or making turns. The shaft 5 is operated from the axle 2 by a train of gearing 6, and its forward end has a crank 7, to which the pitman 8 for transmitting motion to the cutting apparatus is connected. A lever 9 is mounted loosely upon the axle 2 at an intermediate point and is provided with a tapering recess 10 in the inner wall of its bearing-sleeve 11 to receive a roller-clutch 12, which is normally out of action when the machine is in operation. When the outer end of the lever 9 is moved forward, the clutch between it and the axle 2 is brought into play, and said axle receives a corresponding movement and by reason of the train of gearing between it and the shaft 5 rotates the latter and operates the cutting mechanism connected therewith in the manner set forth.

A rod 13 is slidably mounted in brackets or hangers 14, secured to the pole or tongue 15, and a spring 16 is mounted upon the rear portion of the rod and is confined between a stop 17, applied to the rear end of the rod, and the rear hanger or bracket 14. A lug 18 is pendent from the rod, and the front end of a spring 19 has connection therewith, the rear end of the said spring being secured to a pin or bolt 20, slidably mounted in an ear of the front portion of the frame 1. A nut or adjustable stop 21 is applied to the rear end of the pin 20, so as to limit its sliding movement with reference to the frame 1. The spring 19 is closed and the spring 16 open, the one being expanded and the other contracted when applying draft to the machine. The rod 13 is in vertical alinement with the pole or tongue 15 and is placed beneath it for convenience and economy of construction.

A plate 22 is secured to the lower side of the pole or tongue 15 and preferably forms a part of the brackets or hangers 14 and is longitudinally slotted, as shown at 23, forming a guide to receive the upper end of a lug or extension 24, projecting vertically from the rod 13 and upon which the doubletree 25 is mounted. A rod 26 connects the pendent lug 18 with the upper end of the clutch member 9 and transmits motion to the latter when starting the team. The singletrees 27 are connected with the doubletree 25, and the team is hitched thereto.

Under normal conditions and when the machine is at rest the train of connections for imparting an initial movement to the cutting apparatus will appear as shown in Figs. 1 and 2. When the team is started, the draft will be applied directly to the doubletree and rod or bar 13, and the latter will move forward in the hangers or brackets 14 and cause the rod 26 to move forward and operate the clutch-lever 9, which latter, by reason of its clutched engagement with the axle 2, will turn the latter and start the cutting apparatus through the intervention of the intermediate connection prior to the forward movement of the machine. As the rod 13 moves forward the spring 16 will be contracted and the spring 19 correspondingly expanded, thereby gradually overcoming the inertia of the machine. At a point in the forward movement of the rod 13 the tension of the springs 16 and 19 will be such as to wholly overcome the inertia of the machine and cause the latter to advance, when the cutting apparatus previously started will continue to operate by reason of the rotation of the axle 2 through the traction of the ground-wheels 4 in the ordinary manner.

Having thus described the invention, what is claimed, and desired to be secured by Letters Patent, is—

1. In a mowing-machine, the combination with a cutting apparatus and the axle operatively connected therewith, of a lever loosely mounted upon the axle and having clutched engagement therewith, a plate secured to the pole and having offstanding brackets, and a guide between said brackets, a rod or bar slidably mounted in the said brackets and having an extension entering the guide of the plate, a spring mounted upon the slidable rod between a stop thereof and one of the said brackets, a connection between the aforesaid clutch-lever and the slidable rod, and a draft-bar mounted upon the extension of the slidable rod, substantially as set forth.

2. In a mowing-machine, the combination with the cutting apparatus and the axle operatively connected therewith, of a lever loosely mounted upon the axle and in clutched engagement therewith, a longitudinally-slotted plate secured to the side of the pole and having offstanding brackets, a rod slidably mounted in the brackets and provided with an extension operating in the longitudinal slot of the plate, a connection between the slidable rod and the clutch-lever, a spring mounted upon the slidable rod and confined between a stop thereof and one of the said brackets, a contractile spring having its ends connected with the frame and the sliding rod and a draft-bar mounted upon the aforedescribed extension of the slidable rod, substantially as set forth.

3. In a mowing-machine, the combination with the cutting apparatus and the axle operatively connected therewith, and a lever loosely mounted upon the axle and in clutched engagement therewith, of a longitudinally-slotted plate secured to the bottom side of the pole and having pendent hangers, a rod slidably mounted in the hangers and having a vertical extension operating in the slot of the plate and provided with a pendent lug, a spring mounted upon the slidable rod and confined between a stop thereof and the rearmost hanger, a rod connecting the pendent lug with the clutch-lever, a contractile spring having connection with said pendent lug, and having loose and adjustable connection at its rear end with the frame, and a draft-bar mounted upon the vertical extension of the slidable rod, substantially as and for the purpose set forth.

In testimony that I claim the foregoing as my own I have hereto affixed my signature in the presence of two witnesses.

JOHN W. CYPHER.

Witnesses:
W. B. BLAKE,
R. E. COOK.